United States Patent [19]

Jensen et al.

[11] Patent Number: 5,685,649
[45] Date of Patent: Nov. 11, 1997

[54] WHEEL ADAPTED TO ELIMINATE BEARING CLICK

[75] Inventors: Paul C. Jensen, Broomfield; Charles H. Demarest, Boulder; Gerard F. Lutz, Golden, all of Colo.

[73] Assignee: Kryptonics, Inc., Louisville, Colo.

[21] Appl. No.: 573,041

[22] Filed: Dec. 15, 1995

[51] Int. Cl.$^6$ .................................................. F16C 19/08
[52] U.S. Cl. ........................... 384/519; 384/537; 384/544
[58] Field of Search .......................... 384/544, 537, 384/519, 584, 589

[56] References Cited

U.S. PATENT DOCUMENTS

| | | | |
|---|---|---|---|
| 4,218,098 | 8/1980 | Burton | 301/5.7 |
| 4,531,785 | 7/1985 | Perkins | 301/5.7 |
| 4,962,968 | 10/1990 | Caplin | 301/108 |
| 5,048,848 | 9/1991 | Olson et al. | 280/11.22 |
| 5,308,152 | 5/1994 | Ho | 301/5.3 |
| 5,356,209 | 10/1994 | Hill | 301/5.7 |
| 5,362,075 | 11/1994 | Szendel | 280/11.22 |

*Primary Examiner*—Lenard A. Footland
*Attorney, Agent, or Firm*—Greenlee, Winner and Sullivan, P.C.

[57] ABSTRACT

An improved wheel assembly which eliminates "bearing click" is provided with raised, deformable structures placed within a gap between a bearing and fixed structures inside the wheel core. When the bearing is pushed into the wheel to abut at least one such fixed structure, leaving a gap between the bearing and another fixed structure, then tightened mechanically inward into the wheel core, the deformable structure in the gap will be deformed by the bearing as it pushes inward and "cold flow" to form a surface preventing wobbling and "bearing click" when the user presses manually against the wheel hub.

22 Claims, 4 Drawing Sheets

WHEEL ADAPTED TO ELIMINATE BEARING CLICK

FIELD OF THE INVENTION

This invention is in the field of wheels having bearings with inner and outer races, specifically wheels designed for use with skates and other vehicles, and provides a wheel design adapted to eliminate motion of the wheel bearings inside the wheel and resultant bearing click.

BACKGROUND OF THE INVENTION

Wheels of the type adapted for use with skates, such as inline skates, conventional roller skates ("quads"), skateboards, luges, and similar vehicles typically comprise a core comprising two bearings. The bearings are separated from each other by a raised bearing seat on the inner circumference of the wheel core which abuts the edge of the outer race of the bearing, and by the shoulder of a bearing sleeve which has ends inserted axially into the bearings. The shoulder of the bearing sleeve has a face or surface abutting the edge of the inner race of the bearing. When the bearings are tightened into the wheel, such as by exerting mechanical lateral pressure against a hub or other feature in contact with the lateral surfaces of the bearings, if the bearing seat and the face of the shoulder do not lie in exactly the same plane, the inner and outer races of the bearings may be skewed or displaced relative to each other, causing binding of the wheels. Also, if there is a gap between the edge of the outer race and the bearing seat after the bearings are tightened into the wheel, it is possible to manually force the bearings back and forth inside the wheel core, causing an undesirable clicking sound. This clicking is most audible in wheel assemblies having metal parts such as metal bearing sleeves which amplify the sound.

It is difficult to achieve exact tolerances in fabricating the various parts so that the bearing seat and bearing sleeve shoulder face lie in precisely the same plane. Typically, the planes defined by these surfaces can be displaced from each other by as much as about 0.001 to about 0.015 inches.

Consumers of inline skates and wheels of the type used in inline skates typically test the quality of the wheels by manually forcing the bearings back and forth. The occurrence of "bearing click" is perceived as a sign of low quality leading to rejection of the merchandise. Similarly, failure of the wheels to turn freely is perceived as a defect.

A number of patents disclose basic wheel structures, for example, U.S. Pat. No. 5,048,848 issued Sep. 17, 1991 to Olson, et al. disclosing the use of eccentric axle aperture plugs; U.S. Pat. No. 5,362,075 issued Nov. 8, 1994 to Szendel disclosing the use of flanges to protect the bearings from contaminants; U.S. Pat. No. 4,962,968 issued Oct. 16, 1990 to Caplin disclosing a skateboard hubcap for protecting the wheel bearings from contamination; U.S. Pat. No. 4,531,785 issued Jul. 30, 1985 to Perkins disclosing a detachable locking ring to secure the skate wheel to the bearing unit; U.S. Pat. No. 5,356,209 issued Oct. 18, 1994 to Hill disclosing a two-piece axle bolt; U.S. Pat. No. 4,218,098 issued Aug. 19, 1980 to Burton disclosing a flanged hub having a tongue and groove connection with the tire; and U.S. Pat. No. 5,308,152 issued May 3, 1994 to Ho disclosing hubs for enhancing wheel stability.

None of the foregoing patents disclose means for providing uniformly distributed force against wheel bearings so as to eliminate bearing click and prevent wheel binding. Moreover, none of these patents disclose deformable raised structures on surfaces abutting the bearings or the bearing races.

SUMMARY OF THE INVENTION

This invention provides raised, deformable structures within a wheel assembly placed within a gap between a bearing and a fixed structure inside the wheel core. When the bearing is pushed into the wheel to abut at least one fixed structure, leaving a gap between the bearing and another fixed structure, and mechanically tightened, the deformable structure in the gap will be deformed by the bearing as it pushes inward, and will "cold flow" to form a surface preventing wobbling and "bearing click" when the user presses against the wheel hub.

A preferred embodiment comprises at least three raised cones molded 120 degrees apart on the bearing seat. The bearing seat is formed by a raised shoulder in the inner circumference of the wheel. The bearing seat is preferably made of a plastic or other synthetic moldable material. If the mold for the bearing seat is modified by tapping small depressions about 0.001 inch to about 0.015 inch in depth into the metal mold surface which forms the bearing seat, the metal will be slightly raised around the circumference of the depressions by the metal pushed out of the depression. The molded bearing seat will thus comprise a conical projection corresponding to the depression in the mold, surrounded by a trough or depressed circle around the cone corresponding to the raised material on the mold. When the bearing is pushed into the wheel core against the bearing seat by mechanical pressure on the wheel hubs, the cones are deformed and cold flow, with excess material flowing into the surrounding troughs. The bearing is pushed in by clamping the wheel hubs until it encounters a positive stop caused by abutment against the shoulder of a bearing sleeve. At this point, the cones on the bearing seat have been deformed exactly the right amount to provide surfaces in the same plane as the shoulder of the bearing sleeve and prevent the bearing from wobbling when hand pressure is exerted against the wheel hubs.

As will be understood by those skilled in the art, the deformable structures need not be cones. They can be raised dots, ridges, radial ridges, concentric ridges, pyramids, or other geometrical features. Further, they need not be molded as part of the wheel assembly; they can be attached later, such as by placing dots of epoxy on the bearing seat or other fixed surface. They can be formed of epoxies, urethanes, adhesives, foams or other deformable materials.

These deformable structures are preferably, but not necessarily, placed on the bearing seat, but can be placed on the bearing, on the bearing sleeve, or on other fixed surfaces within the wheel where a gap exists between the bearing and the fixed surface.

DETAILED DESCRIPTION

Figure 1:
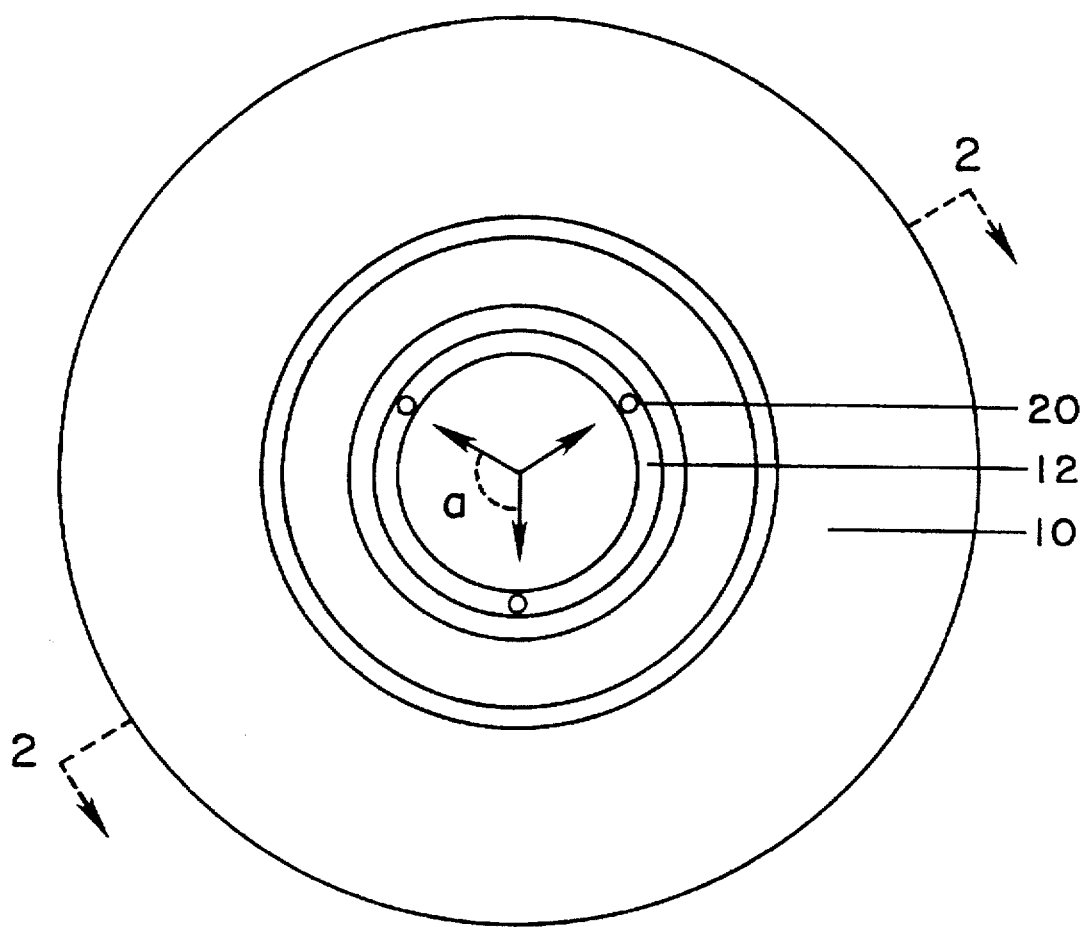
FIG. 1 is a plan view of a wheel of this invention showing raised deformable structures on the bearing seat.

A wheel of this invention is shown in FIG. 1 comprising an outer tire member 10, and a bearing seat 12 (also called a "stop means" herein) having deformable raised structures 20 thereon. The angles (a) between the raised structures 20 are 120° in the preferred embodiment. However, as will be understood by those skilled in the art, these angles need not be 120° so long as the raised structures are spaced to provide a stable support for the bearing.

Figure 2:
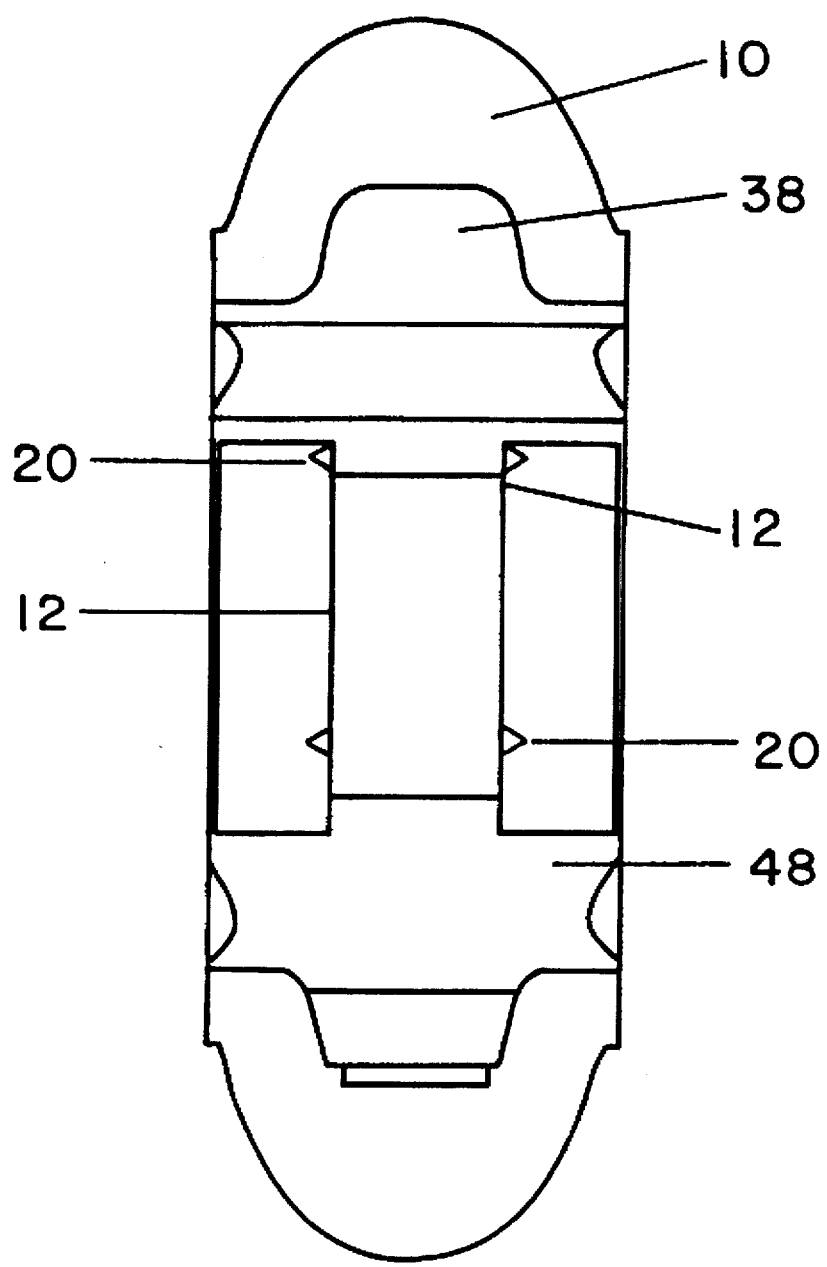
FIG. 2 is a cross-sectional view of the wheel of FIG. 1 taken along line 2—2 showing raised deformable structures on the bearing seat.

FIG. 2 shows a cross-section taken along line 2—2 of FIG. 1, showing the outer tire member 10, the bearing seat 12 ("stop means") with the deformable raised structures 20 molded thereon. The outer tire member is preferably molded of a plastic material such as polyurethane poured over more rigid structures such as outer vane 38 and inner vane 48.

Figure 3:
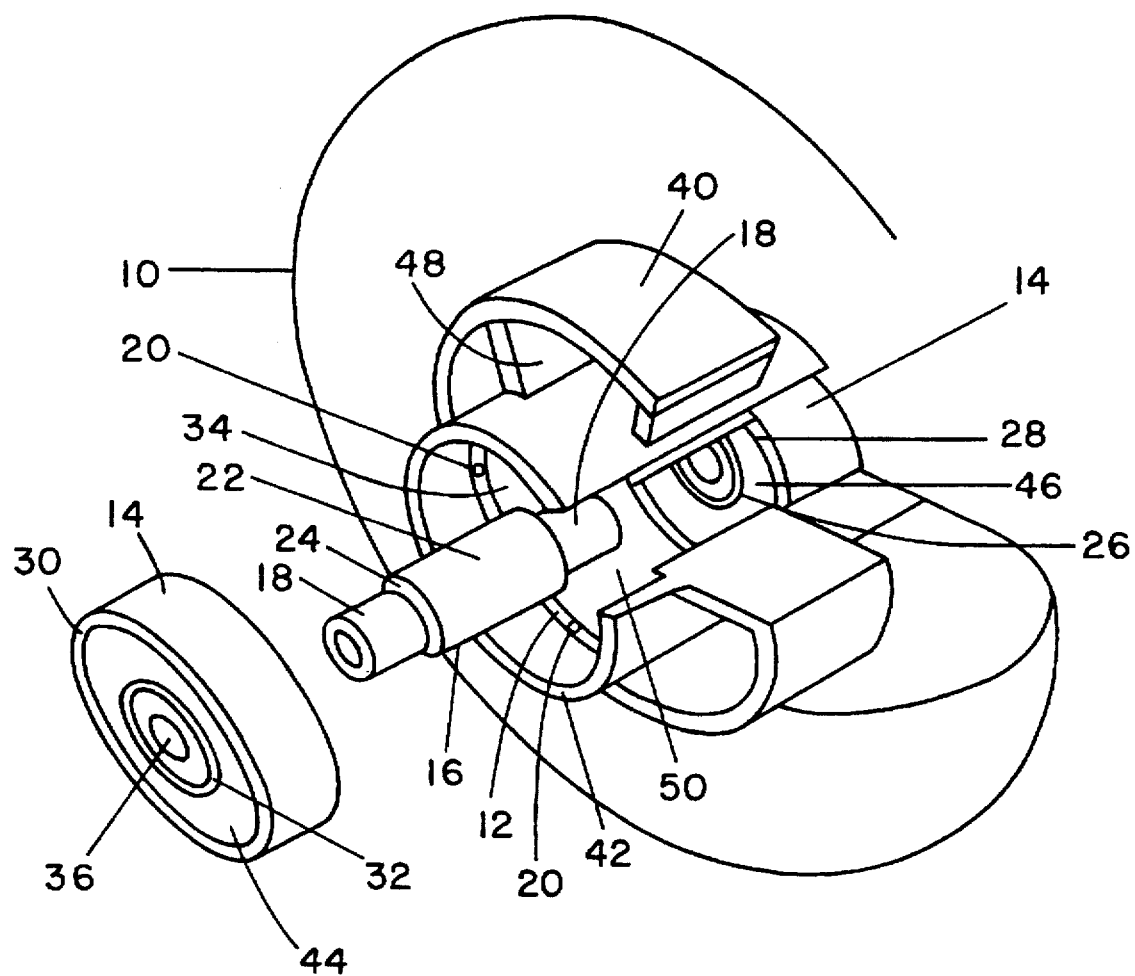
FIG. 3 is a perspective view of the wheel assembly of this invention showing raised deformable structures on the bearing seat.

FIG. 3 is a perspective view of a skate wheel of this invention comprising an outer tire member 10, an outer ring 40 to provide supporting structure for the tire member 10, and an inner ring 42 forming an inner circumference for the wheel and defining a core 50. The inner and outer rings are preferably formed of a molded plastic or other synthetic material, and are connected by spaced inner vanes 48. The wheel may also have outer vanes or projections 39 as shown in FIG. 2 (not shown in FIG. 3). The inner ring 42 has an annular shoulder 34 raised in the center thereof, the lateral sides of which form bearing seat 12. The deformable raised structures 20 of this invention are shown disposed at angles of 120° on bearing seat 12.

Also shown in FIG. 3 are bearings 14, preferably made of metal, comprising an outer race 30 and an inner race 32. The outer race 30 has an outer race medial edge 28 and the inner race 32 has an inner race medial edge 26. The bearings each have a bearing lateral side 44 and a bearing medial side 46, as well as a bearing axial bore 36 through the center of each.

Bearing sleeve 16 shown in FIG. 3 is preferably also made of metal and comprises cylindrical end sections 18 and sleeve shoulder 22 defining shoulder faces 24 (also referred to herein as "stop means").

Figure 4:
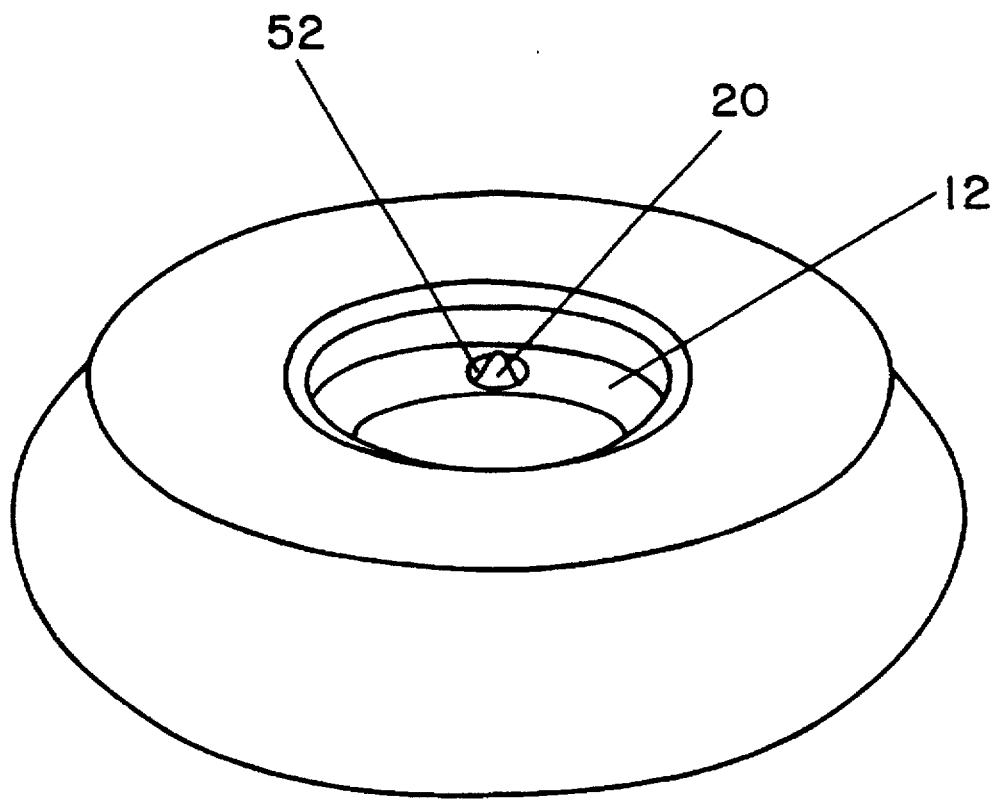
FIG. 4 is a perspective view of the wheel assembly of this invention with the bearing seat having a deformable cone surrounded by a trough molded thereon.

FIG. 4 shows detail of deformable raised structure 20 on bearing seat 12, surrounded by trough 52 having the same volume as the raised structure 20.

When the wheel assembly is assembled, the cylindrical end sections 18 of bearing sleeve 16 are disposed within bearing axial bores 36 and the bearing inner race medial edges 26 abut bearing sleeve shoulder faces 24. If the wheel could be perfectly fabricated, the bearing seats 12 would lie in the same plane as shoulder faces 24 when the wheel was assembled; however, it difficult to mold inner ring 42, annular shoulder 34 and bearing seats 12 with exact tolerances. The tolerances may vary as much as 0.008 inch or more. It is preferred that the inner ring 42 and its structures be molded such that the annular shoulder 34 of the inner ring 42 is the same axial width or narrower than sleeve shoulder 22 so that when the wheel is assembled any gap occurs between the bearing seat 12 and the outer race medial edge 28 rather than between the shoulder face 24 and the inner race medial edge 26.

When the bearings 14 are mechanically tightened down, such as by exerting pressure against wheel hubs (not shown) which is translated to the bearing lateral sides 44, inner race medial edges 26 stop moving inwardly when they abut bearing sleeve shoulder faces 24. If annular shoulder 34 of inner ring 42 is less axially wide than sleeve shoulder 22, there will be a gap between outer race medial edges 28 and bearing seats 12. However, deformable raised structures 20 will have been deformed by pressure from outer race medial edges 28, causing cold flow of the material of deformable raised structures 20 into the surrounding troughs 52. The tops of deformable raised structures 20 thus abut outer race medial edges 28 and prevent the bearing from wobbling in the gap.

The height of deformable raised structures 20 should be at least as great as the anticipated gap between bearing seats 12 and outer race medial edges 28, preferably at least about 0.001 inches, and more preferably at least about 0.003 inches.

In broad conception, this invention provides a wheel assembly designed to eliminate "bearing click" comprising:

(a) a bearing having a lateral side and a medial side and an inner race and an outer race, the medial edges of said races each defining a plane;

(b) a central core for an outer tire member within which core said bearing is disposed during use;

(c) stop means for said bearing disposed within said core comprising a first surface fixed parallel to the plane defined by the medial edge of the outer race and a second surface fixed parallel to the plane defined by the medial edge of the inner race;

(d) a deformable structure disposed between at least one of said fixed surfaces and the medial edge of its corresponding race;

whereby when said first surface does not lie in the same plane as said second surface, and/or when the plane defined by the medial edge of the inner race is not the same as the plane defined by the medial edge of the outer race, said deformable structure absorbs force applied against the lateral side of the bearing to prevent axial displacement of the races relative to each other and to provide an abutment surface to prevent medial movement of the bearing.

The wheel assembly may comprise one or more bearings. A bearing as used herein is a standard bearing disc as known to the art containing and providing a channel for the rotation of ball bearings with a circular outer rim referred to herein as the outer race and a circular inner rim referred to herein as the inner race. The bearing has a lateral planar surface, "lateral" being defined as facing the outside of the wheel, and a medial planar surface, "medial" being defined as facing the inside of the wheel, or if a single bearing is used in the wheel, the medial side is defined as the side facing stop means present in the wheel for preventing the bearing from being pushed completely through the wheel when force is applied to insert and seat the bearing within the wheel.

The outer and inner races each have a lateral and medial circular edge. Each edge defines a plane. Preferably, the axial width of the outer race is identical to the axial width of the inner race, so that a single plane is defined by the lateral edges of each race and a single plane is defined by the medial edges of each race. However, one race may be wider than the other so long as the channel in which the ball bearings rotate is not distorted so as to interfere with rotation of the ball bearings.

The wheel assembly of this invention comprises an outer tire portion in the center of which is disposed a central core (also called an axial bore) typically defined by an annular ring providing an inner circumference for the wheel. Generally, this annular ring is formed of a molded plastic or other suitable synthetic material and forms a relatively rigid substrate for the more flexible material of the outer tire which is preferably formed of polyurethane. The annular ring forming the inner circumference of the wheel and defining the central core may also have other relatively rigid structures extending outward therefrom such as vanes, fingers, or other projections to provide support for the more flexible tire. Preferably the annular ring has a portion (also called a shoulder) raised inwardly toward the center of the wheel and having an edge referred to herein as a "bearing seat."

The central core is adapted for receiving one or more bearings, preferably two bearings. The diameter of the central core should therefore be slightly smaller than that of the bearing to provide for an interference fit, such that the bearing fits snugly inside the core and rotation of the tire and annular ring defining the central core causes rotation of the outer race of the bearing without slippage.

The wheel assembly of this invention comprises stop means for preventing the bearing from being pushed completely through the wheel when force is applied to insert and seat the bearing within the wheel. The stop means can comprise any structure or structures which are fixed with respect to the annular ring and project radially into the central core, and preferably comprise a bearing seat as defined above. When the bearing is pushed as far as possible into the wheel in a medial direction (toward the stop means), the medial edge of the outer race would abut and stop at the bearing seat.

The stop means can also comprise a structure or structures fixed with respect to lateral hubs for the wheel when the wheel is assembled, which project from a component extending axially through the core and extend radially into the core. Preferably the stop means comprise a component which is a bearing sleeve having a cylindrical end section which extends into the axial bore of a bearing and has a raised shoulder with a diameter greater than that of the axial bore of the bearing, providing a shoulder face against which the medial edge of the inner race of the bearing would abut and stop when the bearing is pushed into the central core as far as possible.

The stop means can also comprise rings or washers or other structures placed between the bearing seat and the medial edge of the outer race of the bearing, or between the shoulder face of the bearing sleeve and the medial edge of the inner race of the bearing. The stop means may comprise any means known to the art which provide surfaces fixed with respect to the annular ring defining the central core, against which the medial side or edge of the bearing abuts when the bearing is pushed into the central core.

When the stop means for stopping medial movement of the bearing by abutting the edge of the inner race and the stop means for stopping medial movement of the bearing by abutting the edge of the outer race are not precisely aligned on the same plane, and when the medial edges of the outer and inner races do lie on the same plane, there will be a gap between the bearing and one of the stop means when the bearing is inserted into the wheel until it stops. If pressure, such as mechanical pressure exerted by tightening wheel hubs onto the wheel, is maintained on the bearing, so that it is pushed as far as possible into the wheel, thus closing the gap, the inner race will be pushed out of alignment with the outer race, deforming the channel in which the ball bearings roll, and causing the wheel to bind. On the other hand, if the bearing is not pushed as far as possible into the wheel, it can be moved back and forth causing an undesirable clicking noise.

The deformable structure disposed between at least one of the fixed surfaces making up the stop means and the medial edge of its corresponding race can be any formation which acts to prevent the bearing from moving into the above-described gap. The deformable structure extends laterally outward from the fixed surface, so that the bearing comes in contact with it and deforms it when pushing against it until further movement of the bearing is stopped by another fixed surface making up the stop means. The deformable structure then prevents the bearing from moving into the gap when the user pushes against it with his hand so that no perceptible motion of the bearing, and no bearing click, occurs.

The deformable structure can be any structure which will deform under pressure greater than that produced manually, but will not deform under normal manual pressure, and may be formed from any deformable material including materials selected from epoxies, urethanes, adhesives and foams. Preferably, the deformable structure is a cone; but it may be any other raised shape as will be readily appreciated by those skilled in the art.

In a preferred embodiment, the wheel assembly comprises two bearings, substantially as shown in FIG. 3, and the deformable structures are molded into the bearing seat formed by the raised portion of the inner circumference of the wheel.

Also in a preferred embodiment, the medial edges of the inner and outer races define a single plane, the first and second fixed surfaces define parallel planes offset from each other creating a gap between the medial edge of one of the races and the fixed surface corresponding thereto when the medial edge of the other race abuts the fixed surface corresponding thereto. The deformable structure is disposed within said gap. There may be a gap between the bearing seat and the outer race medial edge, or the gap may be between the bearing sleeve shoulder face and the inner race medial edge. Or if the wheel assembly comprises other structures providing a fixed surface for abutting against the bearings, the gap may occur between such surface and the bearing. It is also understood that the inner race may have an axial width different from the outer race, which may also cause a gap between the bearing and a fixed surface within the wheel.

The gap is preferably not greater than between about 0.001 inch and about 0.015 inch, and more typically between about 0.001 and about 0.005 inch.

The deformable structure may be on a fixed surface or it may be attached to the medial edge of the inner or outer race. It may be attached such as by applying small drops of epoxy or other deformable material to a surface, or may be molded as an integral part of the surface. Preferably, the deformable structure is surrounded by grooves, valleys or depressions providing a space to receive material from the deformable structure when it is deformed. Raised structures having a tapered shape are preferred.

A preferred method of making the wheel assembly of this invention comprises indenting the surface of a mold which forms the bearing seat in at least three places so as to form depressions in said mold surrounded by a raised portion; inserting a moldable material such as a plastic or other synthetic material into the mold; allowing the moldable material to harden in the mold; and removing the hardened material from the mold; whereby a bearing seat has been formed in said hardened material having raised structures surrounded by depressions.

The wheel assembly of this invention is used by applying lateral force to the lateral surface of the bearing, preferably by mechanical means such as clamping the wheel hubs together, whereby the medial edges of the bearing races are moved medially into the wheel core; continuing the application of this force until a positive stop caused by abutment of one of the surfaces inside the wheel against the medial edge of the corresponding race occurs, whereby the surface which first touches the bearing functions as a stop means, and whereby a deformable structure on another surface inside the wheel assembly is deformed so as to provide abutment surfaces for the medial edge of the corresponding race so that these abutment surfaces and the stop means define a single plane.

We claim:

1. A wheel assembly comprising:
   (a) a bearing having a lateral side and a medial side and an inner race and an outer race, the medial edges of the races each defining a plane;
   (b) a supporting structure for an outer tire member comprising an inner ring within which inner ring the bearing is disposed during use;
   (c) stop means for the bearing disposed within the inner ring comprising a first surface fixed parallel to the plane defined by the medial edge of the outer race and a second surface fixed parallel to the plane defined by the medial edge of the inner race;
   (d) a deformable structure disposed between at least one of the fixed surfaces and the medial edge of its corresponding race;
   whereby when the first surface does not lie in the same plane as the second surface, and/or when the plane defined by the medial edge of the inner race is not the same as the plane defined by the medial edge of the outer race, the deformable structure absorbs force applied against the lateral side of the bearing to prevent axial displacement of the races relative to each other and provide an abutment surface to prevent medial movement of the bearing.

2. The wheel assembly of claim 1 comprising two bearings, each of which is provided with stop means comprising fixed surfaces, and the deformable structure is disposed between at least one of the fixed surfaces and at least one of the races.

3. The wheel assembly of claim 1 wherein the medial edges of the inner and outer races define a single plane, the first and second fixed surfaces define parallel planes offset from each other creating a gap between the medial edge of one of the races and the fixed surface corresponding thereto when the medial edge of the other race abuts the fixed surface corresponding thereto; and wherein the deformable structure is disposed within this gap.

4. The wheel assembly of claim 3 wherein the gap is between the medial edge of the outer race and the fixed surface corresponding thereto.

5. The wheel assembly of claim 3 wherein the gap is between the medial edge of the inner race and the fixed surface corresponding thereto.

6. The wheel assembly of claim 3 wherein the gap is between about 0.001 and about 0.015 inches in width.

7. The wheel assembly of claim 1 also comprising a space to receive material from the deformable structure when the lateral force is applied.

8. The wheel assembly of claim 1 wherein the deformable structure is on the fixed surface.

9. The wheel assembly of claim 7 wherein the fixed surface is a bearing seat having at least three of the deformable structures thereon.

10. The wheel assembly of claim 7 wherein the raised structures are conical in shape.

11. The wheel assembly of claim 8 wherein the deformable structure is integrally molded onto the fixed surface.

12. The wheel assembly of claim 7 also comprising a trough in the fixed surface to receive material from the deformable structure when the lateral force is applied.

13. The wheel assembly of claim 7 wherein the raised structures have a tapered shape.

14. The wheel assembly of claim 7 wherein the deformable structure is formed of a material selected from the group consisting of epoxies, urethanes, adhesives and foams.

15. The wheel assembly of claim 7 wherein the fixed surface is defined by a shoulder of a bearing sleeve axially disposed within the bearing.

16. The wheel assembly of claim 1 wherein at least one of the fixed surfaces is defined by a ring disposed between the medial edge of the corresponding race and the stop means for the bearing.

17. The wheel assembly of claim 16 wherein the deformable structure is attached to the fixed surface defined by the ring.

18. A wheel comprising the wheel assembly of claim 1.

19. A skate comprising a wheel of claim 18.

20. A method of making a wheel assembly of claim 18 comprising:
   a) on a mold for the core of the wheel assembly, indenting the surface of the mold which forms the bearing seat in at least three places so as to form depressions in the mold surrounded by a raised portion;
   b) inserting a moldable material into the mold;
   c) allowing the moldable material to harden in the mold;
   d) removing the hardened material from the mold.

21. A method of using a wheel assembly of claim 1 comprising:
   a. applying lateral force to the lateral surface of the bearing whereby the medial edges of the bearing races are moved medially into the core;
   b. continuing the application of the force until a positive stop caused by abutment of one of the first or second surfaces against the medial edge of the corresponding race occurs, whereby the surface functions as a stop means;
   c. whereby the deformable structure on the other of the first or second surfaces is deformed so as to provide abutment surfaces for the medial edge of the corresponding race whereby the abutment surfaces and the stop means define a single plane.

22. A wheel assembly comprising:
   (a) two bearings, each having a lateral side and a medial side and an inner race and an outer race, the medial edges of the races each defining a plane;
   (b) a central core for an outer tire member within which core the bearings are disposed during use;
   (c) stop means medial to each of the bearings disposed within the core comprising, corresponding to each bearing, a first surface which is a bearing seat fixed parallel to the plane defined by the medial edge of the outer race of the bearing and a second surface defined by the shoulder of a bearing sleeve having an end axially disposed within the bearing fixed parallel to the plane defined by the medial edge of the inner race of the bearing; wherein the first surfaces are medially displaced from the second surfaces;
   (d) deformable structures disposed on the first surfaces;
   whereby the deformable structures absorb force applied against the lateral sides of the bearings to prevent axial displacement of the inner and outer races relative to each other and provide abutment surfaces to prevent medial movement of the outer races of the bearings.

* * * * *

UNITED STATES PATENT AND TRADEMARK OFFICE
CERTIFICATE OF CORRECTION

PATENT NO. : 5,685,649

DATED : November 11, 1997

INVENTOR(S) : Jensen et al.

It is certified that error appears in the above-identified patent and that said Letters Patent is hereby corrected as shown below:

In column 7, line 52, claim 9, please rewrite "claim 7" as --claim 8--.

In column 7, line 54, in claim 10, please rewrite "claim 7" as --claim 8--.

In column 7, line 59, in claim 12, please rewrite "claim 7" as --claim 8--.

In column 7, line 62, in claim 13, please rewrite "claim 7" as --claim 8--.

In column 8, line 1, in claim 14, please rewrite "claim 7" as --claim 8--.

In column 8, line 4, in claim 15, please rewrite "claim 7" as --claim 8--.

In column 8, line 24, after "mold" and before the period, please insert the following:

--, whereby a bearing seat has been formed in the hardened material having raised structures surrounded by depressions;

(e) seating said bearing in said bearing seat.--

Signed and Sealed this

Twenty-fourth Day of February, 1998

Attest:

BRUCE LEHMAN

*Attesting Officer*        *Commissioner of Patents and Trademarks*